I. B. Gilbert.
Cultivator.

No. 85,736. Patented Jan. 12, 1869.

Witnesses:
Jacob F. Henry
P. F. Larner

Inventor:
I. B. Gilbert

ISAIAH B. GILBERT, OF LEWISVILLE, INDIANA.

*Letters Patent No. 85,736, dated January 12, 1869.*

IMPROVEMENT IN CULTIVATORS.

The Schedule referred to in these Letters Patent and making part of the same.

*To all whom it may concern:*

Be it known that I, ISAIAH B. GILBERT, of Lewisville, in the county of Henry, and State of Indiana, have invented a new and useful Improvement in Cultivators; and I do hereby declare the following to be a full, clear, and exact description thereof, sufficient to enable others skilled in the art to which the invention appertains, to fully understand and use the same, reference being had to the accompanying drawings, which are made a part of this specification.

The subject of this invention is a cultivator in which provision is made for turning the tongue to the right or left by means of a lever pivoted to its rear end, to be moved by hand, thereby enabling the implement to be more readily turned at the ends of rows and at points where stumps or other obstructions are to be avoided; and the shovel-carriers are pivoted in such a manner that they may move vertically or laterally, and they are employed in connection with devices which enable them to be raised independently or all together, as occasion may require.

In the drawings—

Similar letters of reference indicate corresponding parts in the several figures.

The frame of this implement comprises the main cross-beam A and the uprights B B, joined to each end thereof.

The uprights B B are provided, near their lower ends, with the journals for the ground or carrying-wheels $c\ c$.

Figure 1:
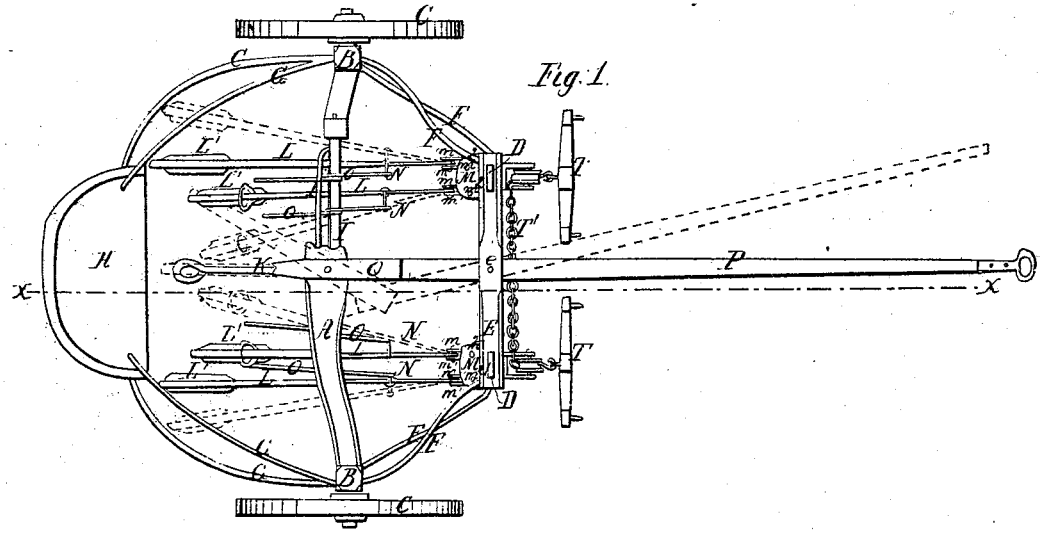
Figure 1 is a plan of a cultivator illustrating my invention.
Figure 2:
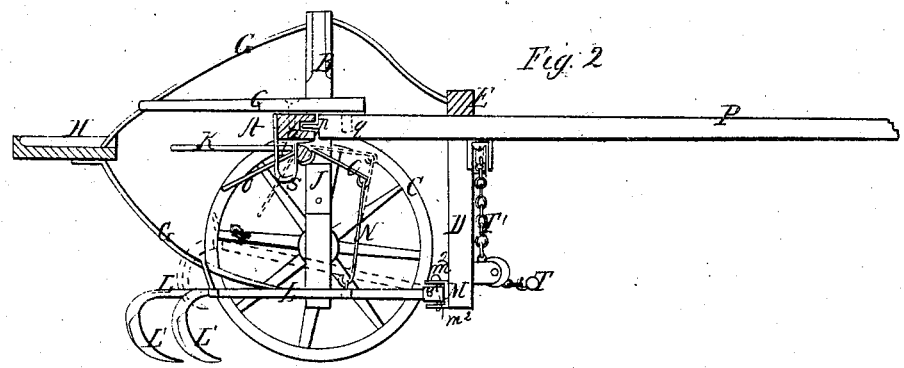
Figure 2 is a vertical section in the plane indicated by the line $x\ x$, fig. 1.
Figure 3:
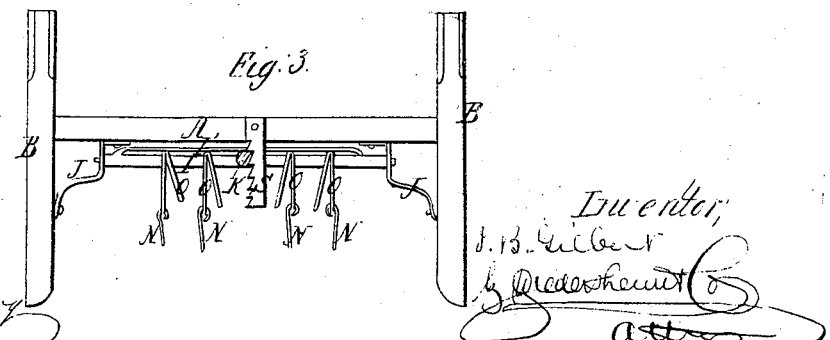
Figure 3 is a rear view of a portion of the cultivator, illustrating the parts whereby the shovels are raised.

In fig. 1, one-half of the beam A is broken away, to expose parts below, but the entire beam is exhibited in fig. 3.

The frame also includes two vertical bars D D, at front, joined by a transverse bar, E, these last-mentioned parts being connected with the parts A B B by the rods F.

Rods G, extending rearward from the uprights B B, support the driver's seat, H.

I represents a transverse shaft, supported beneath the main beam A by the braces J J, which connect the uprights B B with said beam.

K is an arm, projecting backward from the shaft I to a point sufficiently near the driver's seat to enable the driver to depress the same by hand or foot, for a purpose to be explained.

L L are the bars which carry the shovels or blades L′, which penetrate the soil.

Two of the shovel-carriers L L are attached to each of the forward uprights D D by the metallic box or bearing-plate M, which bearings are made fast to said uprights in any suitable manner.

Each shovel-carrier L is attached to the bearing-plate M through the medium of the horizontal pivots $m$, lugs $m^1$, and vertical pivots $m^2$. The pivots $m$ adapt the shovel-carriers to be raised and lowered, and the pivots $m^2$ enable said shovel-carriers to be moved laterally.

The shovel-carriers are supported, at a point somewhat forward of their mid-length, by links or hangers N. (See rear view, fig. 3.)

The hangers are suspended from the forward ends of bent levers O, which have their fulcra upon the shaft I.

I′ is a rod or bar made fast at its ends to the shaft I.

The levers O, projecting backward as well as forward of the shaft I, are turned by the depression of the arm K. The rod I′ bears downward upon the levers O, behind their fulcra, and thus all the shovel-carriers, with their shovels, may be raised at once. Each shovel-carrier may, however, be raised independently of the others by means of its lever O.

By means of the notched bar S, secured to the beam A, the arm K may be adjusted vertically, so as to regulate the depth of the shovel's penetration.

In fig. 1, the rear portion of the lever Q is represented as broken away, so as to exhibit the arm K, which is beneath.

The above-described devices place the cultivator-shovels or teeth under the complete control of the operator. They are simple in arrangement, and can be managed with facility.

The tongue P has pivotal attachment, at $e$, to the bar E, and upon its rear end is formed a tenon or tongue, $p$, which, being confined in a slot or groove, $a$, in the front side of beam A, serves to guide the rear end of the tongue under its lateral movement.

This movement is effected by means of a lever, Q, which is pivoted upon the beam A, and which has a pin, $q$, upon the forward end, occupying a slot or opening in the rear end of the tongue P. By means of the lever Q the driver can turn the tongue to any desired angle with the beam A, and hence the implement may be turned short round, so as to avoid stumps, &c., or when the end of the row is reached.

The whiffle-trees T T are attached to a chain, T′, running over pulleys, so as to equalize the draught; but, if preferred, they may be attached in any other suitable manner, and in a higher position than that in which they are represented.

Having thus described my invention,

What I claim as new herein, and desire to secure by Letters Patent, is—

1. The transverse shaft I and rod I′, in combination with the arm K and levers O, for raising the shovel-carriers separately or collectively, substantially as described.

2. The combination of the beams L L′, plates M, pivots $m\ m^2$, lugs $m^1$, shaft I, arm K, rod I′, levers O, pivoted tongue P, and lever Q, substantially as described, for the purpose specified.

To the above I have signed my name, this 31st day of July, 1868.

ISAIAH B. GILBERT.

Witnesses:
  JAMES F. WATSON,
  JAMES W. FELLOWS.